US009223805B2

(12) United States Patent
Skidanov et al.

(10) Patent No.: US 9,223,805 B2
(45) Date of Patent: Dec. 29, 2015

(54) DURABILITY IMPLEMENTATION PLAN IN AN IN-MEMORY DATABASE SYSTEM

(71) Applicants: Alex Skidanov, San Francisco, CA (US); Marko Tintor, San Francisco, CA (US); Adam Prout, San Francisco, CA (US)

(72) Inventors: Alex Skidanov, San Francisco, CA (US); Marko Tintor, San Francisco, CA (US); Adam Prout, San Francisco, CA (US)

(73) Assignee: MemSQL, Inc., San Francisco, CA (US)

( * ) Notice: Subject to any disclaimer, the term of this patent is extended or adjusted under 35 U.S.C. 154(b) by 189 days.

(21) Appl. No.: 13/754,301

(22) Filed: Jan. 30, 2013

(65) Prior Publication Data
US 2013/0198139 A1 Aug. 1, 2013

Related U.S. Application Data

(60) Provisional application No. 61/592,434, filed on Jan. 30, 2012.

(51) Int. Cl.
G06F 7/00 (2006.01)
G06F 17/30 (2006.01)
G06F 11/14 (2006.01)

(52) U.S. Cl.
CPC ...... *G06F 17/30289* (2013.01); *G06F 11/1471* (2013.01); *G06F 11/1446* (2013.01); *G06F 2201/80* (2013.01); *G06F 2201/84* (2013.01)

(58) Field of Classification Search
CPC ............ G06F 11/1471; G06F 2201/80; G06F 11/1446; G06F 17/30368; G06F 2201/84
USPC .................. 707/639, 648, 672, 682
See application file for complete search history.

(56) References Cited

U.S. PATENT DOCUMENTS

| | | | |
|---|---|---|---|
| 5,870,758 A * | 2/1999 | Bamford et al. ....................... 1/1 |
| 5,963,959 A * | 10/1999 | Sun et al. ................................ 1/1 |
| 6,732,124 B1 * | 5/2004 | Koseki ................ G06F 11/1435 1/1 |
| 6,732,125 B1 * | 5/2004 | Autrey ................ G06F 11/1466 707/640 |
| 6,981,114 B1 * | 12/2005 | Wu et al. ........................ 711/162 |
| 7,707,174 B2 * | 4/2010 | Saito et al. .................... 707/609 |
| 8,225,058 B2 * | 7/2012 | Miyamoto et al. ............ 711/162 |
| 2002/0103654 A1 * | 8/2002 | Poltorak ........................... 705/1 |
| 2004/0267835 A1 * | 12/2004 | Zwilling et al. ............... 707/202 |
| 2007/0083564 A1 * | 4/2007 | Ramacher et al. ............. 707/200 |
| 2008/0177957 A1 * | 7/2008 | Lee ................................. 711/161 |
| 2012/0011106 A1 * | 1/2012 | Reid et al. ...................... 707/695 |
| 2012/0109895 A1 * | 5/2012 | Zwilling ............. G06F 11/1471 707/648 |
| 2012/0221528 A1 * | 8/2012 | Renkes et al. ................. 707/674 |

* cited by examiner

*Primary Examiner* — Cheyne D Ly
(74) *Attorney, Agent, or Firm* — Robert M. McDermott

(57) ABSTRACT

A database durability implementation records only committed transactions in a log file. A pair of log files and a pair of snapshot files are maintained. When a snapshot of the database is completed, the 'current' log becomes the 'prior' log and the other log becomes the 'current' log. After the next snapshot is completed, the prior log and prior snapshot may be deleted. Transactions that are not committed are not recorded in the current log, thereby avoiding the need to undo aborted transactions. If a given change is reflected in a completed snapshot, it does not appear in either of the logs; if the change is not yet reflected in a completed snapshot, it is guaranteed to be stored in one of the logs. During recovery, the system assesses both snapshots. The most recent of the completed snapshots is used, and the corresponding log(s) is (are) applied.

21 Claims, 4 Drawing Sheets

DURABILITY IMPLEMENTATION PLAN IN AN IN-MEMORY DATABASE SYSTEM

This application claims the benefit of U.S. Provisional Patent Application 61/592,434, filed 30 Jan. 2012.

BACKGROUND AND SUMMARY OF THE INVENTION

This invention relates to the field of database management systems, and in particular to a method and system that assures that all committed transactions survive permanently, regardless of crashes or other interruptions.

A fundamental requirement for a reliable database management system is "durability", the ability of the database system to recover from crashes or other interruptions in a consistent state. For example, if a user executes a transaction that changes one or more objects (record) in the database and a crash or other interruption occurs during the execution of the transaction, the user should be able to determine whether the transaction was performed ('committed'), and be assured that any changes that were made before the transaction was completed are not recorded in the database. In like manner, if a user interrupts the execution of a transaction by issuing an 'abort' command, the user should be assured that any changes that may have already been made before the abort command was received are not reflected in the database.

In many database systems, including IBM DB2 and Microsoft SQL Server, the 'ARIES' (Algorithms for Recovery and Isolation Exploiting Semantics) system is used to provide such durability. ARIES uses 'write-ahead' logging to record each change to an object in the database before the change is actually implemented. If the system is interrupted, the system restores a prior version of the database and processes the write-ahead log to recreate the database with all of the changes that had been submitted. The system also identifies incomplete transactions and un-does each of the changes associated with these incomplete transactions.

The ARIES write-ahead log records the start of the transaction and each of the changes caused by the transaction. As each change is recorded in the write-ahead log, it is subsequently executed. Because multiple transactions may be processed concurrently, each change is assigned a unique sequence number, and the record of each change in the write-ahead log includes its sequence number, an identifier of the transaction, the page of the database that is affected, and its prior sequence number. The prior sequence number facilitates un-doing changes in the event the transaction is aborted or a crash occurs before the transaction is committed. After the last change of the transaction is submitted, an end-of-transaction record is recorded in the write-ahead log, and the transaction is deemed 'committed'.

Although the ARIES technique provides a reliable means for providing consistent database recovery, it is structured based on the paradigm of a disk-based database system, and may not be optimal for in-memory database systems. For example, ARIES uses the concept of disk caching, wherein pages of the database on the disk are loaded as required into local memory, modified, then written back to the disk periodically. This concept requires maintaining a "Dirty Page Table" that identifies each of the changes that have been applied to the pages in local memory but not yet written back to the disk, and the recovery process must account for these changes as well.

Additionally, the use of a write-ahead log that records each change before it is performed, then commits the transaction after all changes are performed, may be inefficient for use in an in-memory database system, particularly with respect to having to undo the changes written to the log during an incomplete or aborted transaction when recovering the database.

It would be advantageous to provide a durability scheme that is optimized for an in-memory database system. It would also be advantageous to provide a durability scheme that does not incur the overhead associated with a page-based recovery technique. It would also be advantageous to provide a durability scheme that does not incur the overhead associated with a write-ahead log and/or the overhead associated with undoing changes for incomplete transactions by undoing the changes recorded in the write-ahead log.

These advantages, and others, can be realized by a durability implementation that records only committed transactions in a log file. A pair of log files and a pair of snapshot files are maintained. Committed transactions are stored in a 'current' log. When a snapshot of the database is completed, the 'current' log becomes the 'prior' log and the other log becomes the 'current' log. After the next snapshot is completed, the prior log is deleted, the current log becomes the prior log, and the prior snapshot can be replaced by the next subsequent snapshot. Transactions that are not committed are not recorded in the current log, thereby avoiding the need to undo aborted transactions. If a given change is reflected in a completed snapshot, it does not appear in either of the logs; if the change is not yet reflected in a completed snapshot, it is guaranteed to be stored in one of the logs. During recovery, the system assesses both snapshots. The most recent of the completed snapshots is used, and the corresponding log is applied.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

Figure 1:
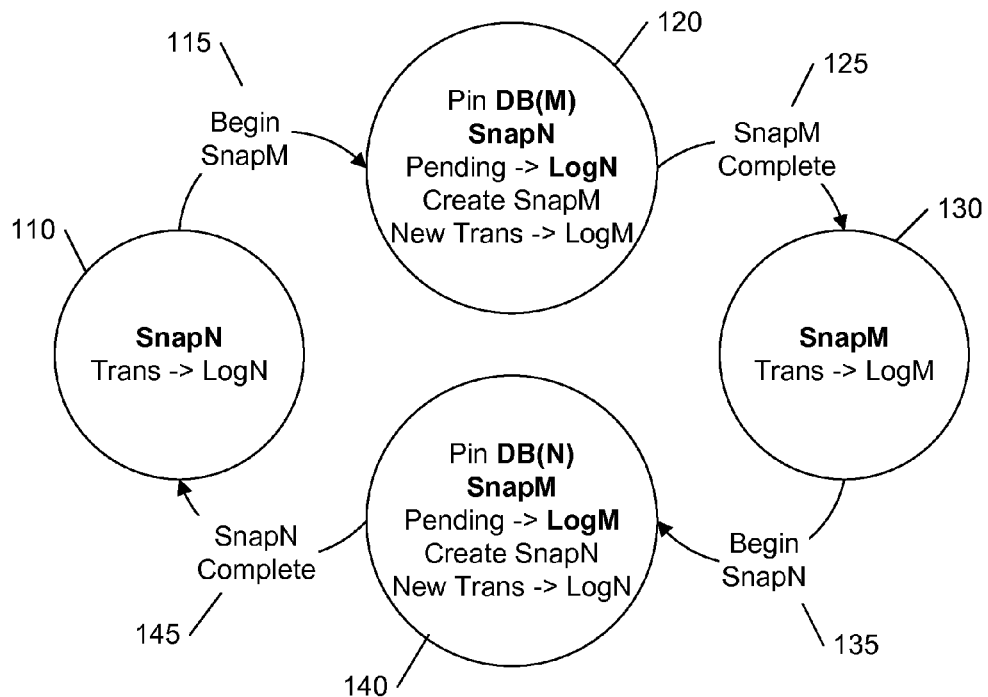
FIG. 1 illustrates an example state diagram of a database backup system in accordance with aspects of this invention.

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

The invention is presented herein using an example database access system that uses timestamp-based concurrency control, such as MVCC (Multiversion Concurrency Control). In a timestamp-based concurrency control access system, instead of replacing a current value of an object with a new value, a copy of the object is created. Each transaction is identified by a timestamp, or other unique monotonically increasing identifier, such as a transaction sequence number. This transaction identifier is associated with the transaction when the transaction begins, and is assigned to each of the copies of objects that the transaction creates.

Each object also has a last-read record and an optional last-written record, each containing the transaction identifier that read or wrote the object, respectively. When a Read operation is submitted, the most recent copy of the object that precedes this transaction identifier is read, and the last-read record is updated by the larger of its current value and this transaction identifier. Optionally, if a last-written record is maintained, and this transaction precedes the last write to this object, the transaction may be aborted, so that the more recent value is read.

If a Write operation is submitted, the last-read record is compared to the transaction identifier, if the most recent read of this object precedes the transaction identifier, it is safe to create a new copy with the current transaction identifier. If, on the other hand, a read in a later transaction has occurred before the write in this transaction, the transaction is aborted and resubmitted, to assure that the write occurs after the last-read transaction.

The transaction record also includes a list of all objects that the transaction has updated, and all of the transactions that it depends upon (e.g. if a current transaction reads a value of an object that has been written by an uncommitted transaction, the current transaction is dependent upon this uncommitted transaction). Before a transaction is committed, it must wait until all of its dependent transactions are committed.

If an abort occurs, each object in the list is processed and the copies created by the transaction are deleted, and the last-written record is updated. Each of the transactions that are dependent upon the aborted transaction are also aborted (and resubmitted).

Otherwise, at the end of the transaction, and after all dependent transactions are committed, the completed transaction is 'committed'. For the purposes of this disclosure, a "committed" transaction is a transaction in which all actions have been performed and completed. After the transaction has been committed/completed, it may be marked as a committed transaction, e.g. by setting a 'committed' flag associated with the transaction record, but this marking, per se, is not required for determining whether a transaction is a committed transaction.

In accordance with an aspect of this invention, only the transactions that are committed are entered into a transaction log. As noted above, the transaction record includes all of the objects that the transaction has updated, if any; null transaction records need not be entered in the log. The log is used to restore the database in the event of a system crash or other interruption, and thus need only contain a record of the changed objects, and need only contain changed objects from committed transactions. Preferably, the logging of a transaction occurs immediately after the transaction is completed/committed, and the transaction may subsequently be marked as being a committed transaction, thereby completing the processing of this transaction.

Unlike ARIES and other systems that maintain a write-ahead log, in embodiments of this invention the recovery process need not include processes for handling aborted transactions, because the log is purposely configured to contain only committed transactions.

To avoid having to maintain an extremely large log file, periodic snapshots may be taken of the database, and the log file need only contain the transactions that have occurred since the last snapshot was taken. By taking a snapshot and recording records that have been updated since the snapshot was taken, there is no need to maintain a list of changed pages ('dirty pages') in the database, as in the ARIES system and others.

Conventionally, a snapshot requires the database to be locked, to assure that new transactions are not applied, so that changes do not occur while the snapshot is being created. In this manner the snapshot is guaranteed to match a current state of the database, from which the log file identifies changes. This locking generally requires that all pending transactions be allowed to be completed and committed, and the execution of any new transactions is postponed.

To eliminate the need to lock the database and delay execution of transactions, in an embodiment of this invention two snapshot files are used. (The term 'file' is used herein to mean any structured form of storage, including a data structure in memory.) Each of these two snapshot files have an associated transaction log file that records transactions that occur after the snapshot is taken. By using two snapshot files, and two log files, pending transactions can be included in the 'current' log, and new transactions can be included in the 'new' log, thereby avoiding the need to delay execution of the transactions.

FIG. 1 illustrates an example state diagram for tracking changes to a database using two snapshot files (SnapN, SnapM) and two associated transaction log files (Log N, Log M).

At state 110, snapshot SnapN exists, and subsequent committed transactions are being recorded in Log N. (For ease of understanding, a file that is unchanging ('frozen') is illustrated in 'bold', and a file that is being updated is not in 'bold'. In this state, SnapN is frozen, and Log N is being updated with transactions since SnapN was frozen.)

At some point in time, the system initiates another snapshot (SnapM) 115. The scheduling of when to take snapshots may take a variety of forms, or combinations of forms. In some embodiment, when the size of Log N crosses a threshold, a new snapshot is initiated; in other embodiments, snapshots are taken periodically; other scheduling techniques will be apparent to one of skill in the art in view of this disclosure.

At state 120, the creation of SnapM commences. As noted above, in an MVCC embodiment, transaction-stamped copies of each changed object are maintained; periodically, the MVCC system will perform "garbage-collection" to remove outdated copies. When a new snapshot is being created, the database is 'pinned' in memory to prevent garbage collection, or limit garbage collection, to assure that the state of the database at the time that the snapshot commences is maintained until after the snapshot is completed. The letter M is used to identify the state of the database (DB(M)) at the time that SnapM is begun.

Pending transactions (transactions started before state M) continue to be logged into Log N when they are committed, and Log N is frozen when all pending claims are committed (or aborted). Committed transactions that commenced after state M are logged to Log M.

SnapM is created by copying the latest values of each object at or before state M. To assure that SnapM properly reflects state M, this copying commences after all of the pending claims are committed (or aborted). This delay has no effect on the tracking of changes, because all new committed transactions are logged to Log M.

As new transactions are executed, new copies of objects will be created, but their transaction-stamp will show that the update occurred subsequent to state M, and thus they will not be copied into SnapM. As pending transactions are committed and logged to Log N, the updated object values are also reflected in SnapM. That is, upon completion, SnapM is guaranteed to represent the database at state M.

When SnapM is completed 125, the system advances to state 130. Since SnapM represents the database at state M (DB(M)) and Log M includes all of the updates that were made to the database after state M, the current state of the database can be recovered by applying the changes in Log M to a copy of SnapM to produce the recovered database. Thus, state 130 only requires the frozen snapshot SnapM and the log of currently committed transactions Log M. The database may be unpinned to allow for routine garbage collection, and SnapN and Log N are no longer required.

State 130 is identical to state 110, with N replaced by M in SnapM and Log M. Similarly, transition 135 is identical to transition 115, state 140 is identical to state 120, and transition 140 is identical to transition 125, with N replaced by M. The process continues to advance through states 110-120-130-140-100 . . . indefinitely.

Figure 2:
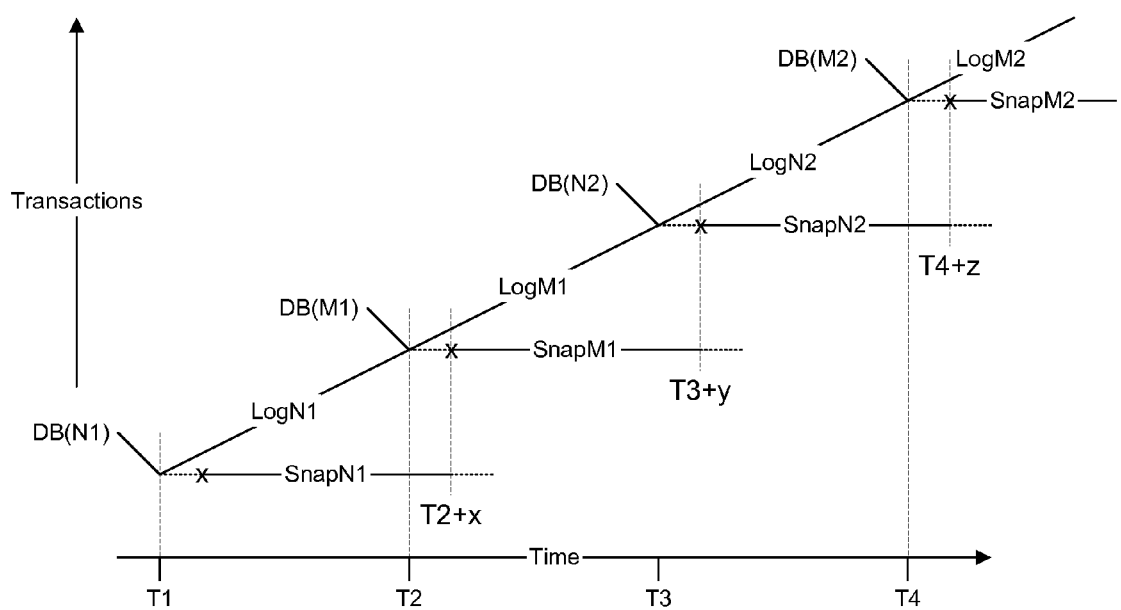
FIG. 2 illustrates an example timing diagram corresponding to the example state diagram of FIG. 1.

FIG. 2 illustrates a view of the tracking system over time. The vertical axis represents the identifiers (timestamps) of the committed transactions (state of the database) that are applied to the database.

At a first time T1, the system initiates a snapshot of the database at state N1. The snapshot SnapN1 includes the state of the database at DB(N1). Between this first time T1 and a second time T2, all committed transactions are logged into Log N1, thereby representing all of the changes that have occurred since DB(N1), or equivalently, SnapN1. At the second time T2, the system initiates a snapshot of the database at state M1. The snapshot SnapM1 includes the state of the database at DB(M1). Between this second time T2 and a third time T3, all committed transactions are logged into Log M1, thereby representing all of the changes that have occurred since DB(M), or equivalently, SnapM1.

As illustrated by the dotted line at the start of SnapM1, it may take some time (x) for the snapshot to be completed. Accordingly, SnapN1 must be retained at least until time T2+x. The above process is repeated at times T4, T4+y, T5, T5+z, etc., alternating between SnapN and SnapM, and Log N and Log M, wherein y and z are the times required to complete the snapshots SnapN2 and SnapM2, respectively. If at any cycle, the time required to complete the snapshot exceeds the scheduled time for initiating the next snapshot, the initiation of the next snapshot is postponed until the prior snapshot is completed.

Figure 3:
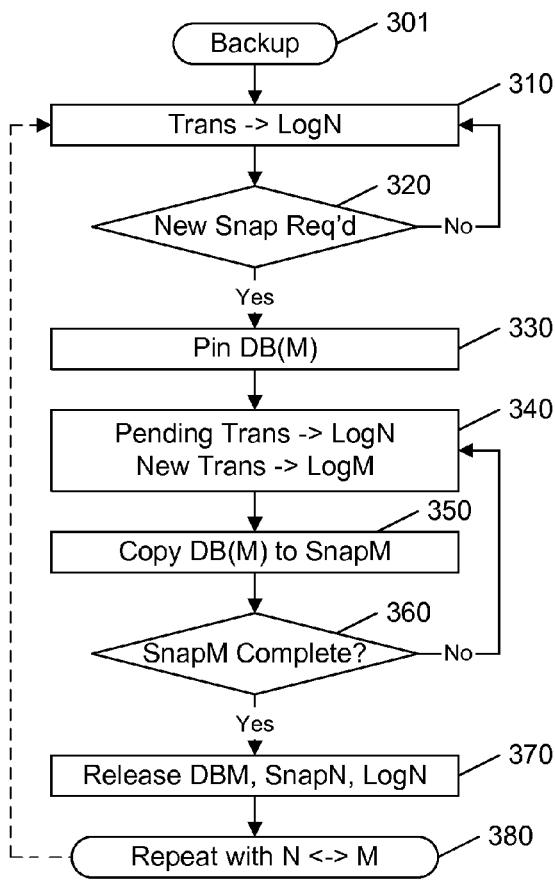
FIG. 3 illustrates an example flow diagram of a database backup system in accordance with aspects of this invention.

FIG. 3 illustrates an example flow diagram for backing up a database, corresponding to the state diagram of FIG. 1. At 301, it is assumed that a snapshot, SnapN, has been taken, and new transactions continue to be recorded into Log N, at 310. When, at 320, a new snapshot is to be taken, the database at the current state, DB(M) is 'pinned', at 330, to avoid having information required to create or copy DB(M) subject to garbage collection. New committed transactions are thereafter logged into Log M, while pending transactions continue to be logged into Log N when they become committed, at 340.

The copying of the database DB(M) into SnapM is commenced, at 350. As noted above, this copying will generally be postponed until all of the pending transactions are committed; otherwise, the snapshot SnapM will be updated as required after all pending transactions are committed. In this manner, it is assured that SnapM corresponds to the state M of the database, including all transactions that started prior to state M, even if they hadn't yet been committed when the new snapshot was commenced.

When the snapshot SnapM is completed, at 360 including the completion of all pending transactions initiated prior to state M, the state of the database DB(M) may be unpinned to allow routine garbage collection, and SnapN and Log N may be released, at 370.

The process is repeated, with SnapM replacing SnapN, and Log M replacing Log N, at 380. On the next cycle, SnapN replaces SnapM, and Log N replaces Log M, and this exchange of the roles of the snapshot files and log files continues for each snapshot event.

Figure 4:
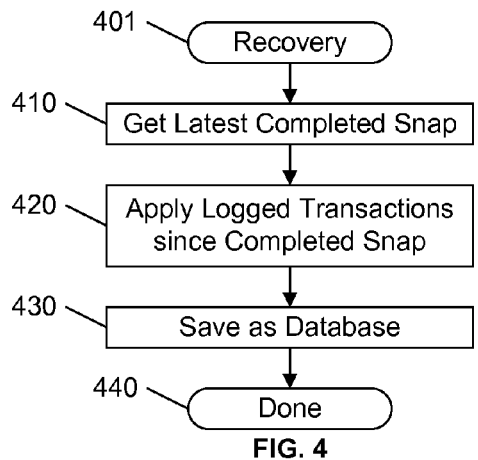
FIG. 4 illustrates an example flow diagram of a database recovery in accordance with aspects of this invention.

An example recovery process is illustrated in the flow diagram of FIG. 4. When a database recovery is required, the latest completed snapshot (SnapN or SnapM) is accessed, at 410, and all logged transactions subsequent to the state of the last completed snapshot are applied to create a recovered database 420, which is then used as the database for subsequent transactions, at 430. Transactions that were pending when the interruption occurred that triggered the recovery process are not reflected in the recovered database, and thus no actions need be taken to remove the effects of these aborted transactions. As is common in the art, when an interruption occurs, the user and/or process having a pending uncommitted transaction is advised of this interruption, allowing the user or process to resubmit the aborted transaction.

It is important to assure that the recovery process will provide the latest copy of the committed database (database will all committed transactions) when an interruption occurs, regardless of the state of the system at the time of the interruption.

Consider an interruption that occurs while the system is in state 110 of FIG. 1. In this state, SnapN contains a copy of the database at state N, and Log N contains all of the changes introduced after state N by committed transactions, up until the state at which the interruption occurred. Accordingly, applying the changes of Log N to a copy of SnapN will create a copy of the committed database at the time of the interruption.

Consider an interruption that occurs while the system is in state 120 of FIG. 1. In this state, SnapN contains a copy of the database at state N, Log N contains all of the committed changes introduced up until state M, and Log M contains all of the committed changes introduced after state M. By applying the changes of Log N to SnapN, followed by applying the changes of Log M to this combination of SnapN and Log N, a copy of the committed database up until the occurrence of the interruption is produced.

As noted above, states 130 and 140 correspond to states 110 and 120, respectively, except that 'N' and 'M' are reversed. If the interruption occurs at 130, applying Log M to SnapM will provide the recovered committed database, and if the interruption occurs at 140, applying Log M and Log N to SnapM will provide the recovered committed database.

Figure 5:
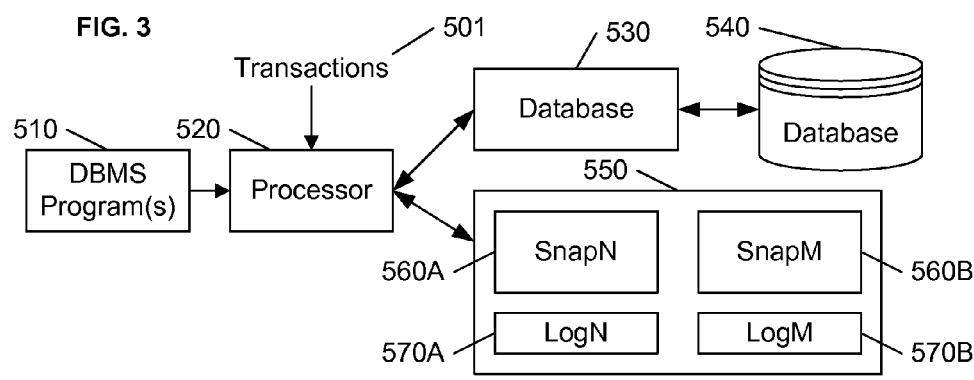
FIG. 5 illustrates an example block diagram of a database backup and recovery system in accordance with aspects of this invention.

FIG. 5 illustrates an example database management system (dbms) in accordance with aspects of this invention. In this example, a set of dbms programs 510 are executed by a processor 520, to perform transactions 501 that may be submitted by a user (which may be another process). In this example embodiment, the database may be stored on persistent storage, such as a disk 540, but loaded into faster-access memory 530, such as semiconductor memory, commonly referred to as "RAM" (Random Access Memory). Due to the relative costs and performance of different types of memory, the memory 530 into which the database is loaded is generally "volatile memory" or "dynamic memory" which provides fast read and write access at very low cost. As the name implies, however, such memory is subject to erasure when an interruption occurs. Accordingly, means are provided to backup and recover the current state of the database when such an interruption may occur.

In the example of FIG. 5, non-volatile, or static, memory 550 is used to store a backup copy of the database as each transaction is committed, as detailed above, and detailed further below. The non-volatile memory 550 is generally a semiconductor memory that retains its stored data despite interruptions. In some embodiments, this memory 550 may provide relatively permanent retention of data, or it may provide temporary retention of the data, for a period considered long enough to assure recovery of the database. That is, for example, the memory 550 may be a conventional volatile memory that is powered by a self-contained power supply ("battery RAM"); when external power is interrupted, the volatile memory 530 may be erased, but the portion of memory 550 that is powered internally will retain its data for at least as long as the battery provides sufficient power. In other cases, the memory 550 may be a semiconductor memory that does not require power to retain its contents, commonly termed EEROM (Electronically Erasable Read-Only Memory); however, EEROMs typically exhibit substantially longer write times than conventional volatile memory.

In this example embodiment, the non-volatile memory 550 is used to store the aforementioned snapshot files SnapN 560A and SnapM 560B, as well as the log files Log N 570A and Log M 570B. By placing these files in the non-volatile memory 550, these files may be used to restore the contents of memory 530 in the event of an interruption to the memory 530. The dbms program 510 controls the processor 520 to create and use these snapshot and log files for such backup and recovery as disclosed above, or as disclosed further below.

By providing a capability of restoring the latest committed state of the database to the memory 530, the need to periodically store the committed state of the database in memory 530 to persistent storage 540 is substantially reduced, thereby avoiding the overhead typically associated with disk read and write operations.

One of skill in the art will recognize that given the disclosed use of two snapshot files and corresponding log files, alternative techniques may be used to create and use these files.

For example, as disclosed above, the creation of each snapshot file includes copying each of the data objects in the database. The overhead incurred by such copying will be dependent upon the size of the database, and in some cases, may limit how often such snapshots are created. With infrequent snapshots, the size of the log files will increase, and the time to recover from an interruption will increase, due to the increase in the number of changes included in these log files.

In an alternative embodiment, one recognizes that the snapshot file includes a copy of the database at a prior state, and the log file includes the changes to the database since that prior state. Accordingly, the next snapshot can be obtained by applying the changes in the log file(s) to the prior snapshot file.

For example, in the timing diagram of FIG. 2, SnapN1 contains a copy of the database at state N1. Log N1 and Log M1 include all of the committed changes that have occurred since state N1. The contents of SnapN1 are not required to be retained after SnapM1 is completed (nominally, soon after T2, at T2+x). Accordingly SnapN1 can be updated to include all of the changes in Log N1, thereby producing a copy of SnapM1, but without having to copy all of the elements of SnapM1 or all of the elements of the database. Thereafter, this modified SnapN1 can be updated to include all of the changes in Log M1, thereby producing the new SnapN2, which is a copy of the database after all of the changes in Log M1 are applied to SnapM1.

Note that in this embodiment, the memory containing SnapN1 must not be modified until after SnapM1 is completed, as in the prior embodiment, and the memory containing Log N1 must be made available at time T3 to initiate logging of the committed transactions after T3. Alternatively stated, the updating of SnapN1 commences after the completion of SnapM1, and the termination of the current snapshot SnapM1 does not occur until after Log N1 has been applied to SnapN1.

Figure 6:
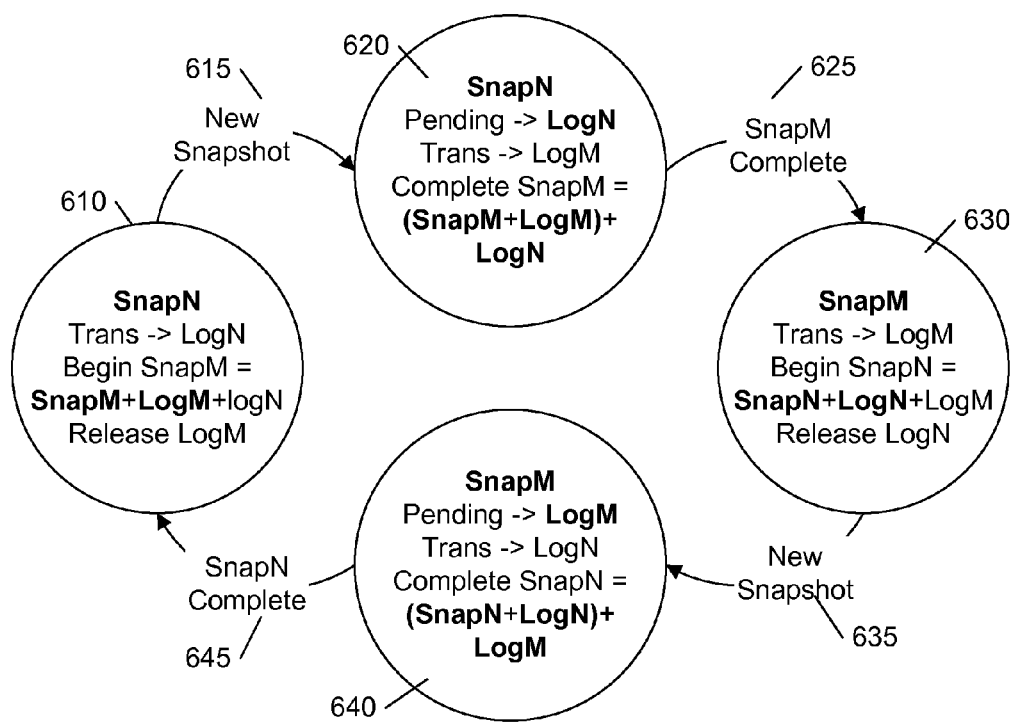
FIG. 6 illustrates an alternative example state diagram of a database backup system in accordance with aspects of this invention.
Figure 7:
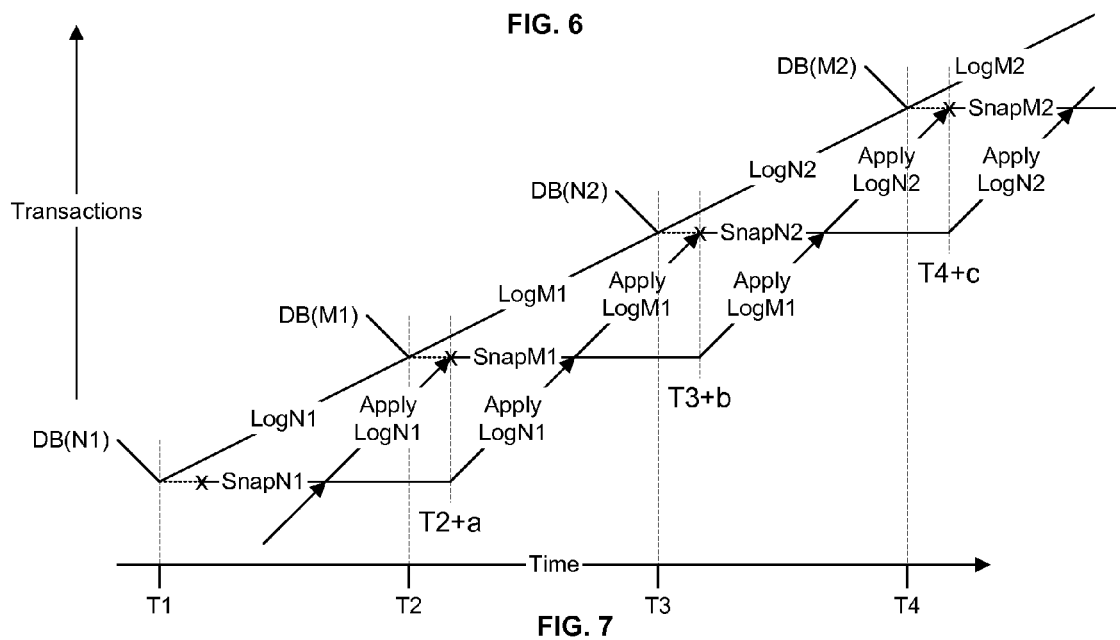
FIG. 7 illustrates an example timing diagram corresponding to the example state diagram of FIG. 6

FIG. 6 illustrates an example state diagram, and FIG. 7 includes a timing diagram, that includes this creation of a snapshot based on the log of changes since the prior snapshot at the corresponding memory location (i.e. create SnapN2 and SnapM2 based on the log of changes since the prior snapshots SnapN1 and SnapM1, respectively). In FIG. 6, the snapshots and logs are identified by generic symbols N and M, whereas in FIG. 7, the specific versions of the snapshots and logs are identified by specific symbols N1, N2, etc. and M1, M2, etc.

The state diagram of FIG. 6 may best be understood starting at transition 625, the completion of a snapshot SnapM, corresponding, for example to time T2+a in FIG. 7. In this state, the snapshot SnapM1 is frozen, and transactions are being logged to Log M1.

Because SnapM1 is completed and frozen at T2+a, the prior snapshot SnapN and log Log N1 are not required to be maintained after this time, as in the prior embodiment. However, in this embodiment, it is recognized that SnapN1 represents a copy of the database at state N1, DB(N1), and may be updated to reflect the new state of the database DB(N2), rather than replaced by an explicit copying of the database DB(N2). Accordingly, at state of FIG. 6, the prior snapshot SnapN1 is updated by applying the changes in the frozen Log N1, and the changing Log M1. When all of the changes in Log N are applied to SnapN1, Log N may be released, and a new snapshot may be initiated.

When the new snapshot is initiated, at 635 in FIG. 6, and T3 in FIG. 7, the prior snapshot SnapM1 has been frozen, the committed pending transactions are logged into Log M1, and new transactions are logged into Log N2. The new snapshot SnapN2 is obtained by completing the application of the changes in Log M1 to the combination of SnapN1 and Log N1. Note that, because the new snapshot is obtained from the log of changes to the prior snapshot, rather than from the actual contents of the database, the state of the database DB(N2) does not need to be pinned to avoid garbage collection. Accordingly, this embodiment may be well suited for systems that do not necessarily retain prior values of objects in the database.

Upon completion of the snapshot SnapN2, at time T3+b in FIG. 7, transition 645 to state 610 in FIG. 6, the prior snapshot SnapM1 is no longer required to be frozen. Accordingly, at state 610, an updating of this snapshot SnapM1, to obtain the next snapshot SnapM2, can be initiated by applying frozen Log M1 and changing Log N2 to SnapM1, as detailed above with regard to symmetric state 630.

When a new snapshot is initiated at 615, after applying the changes of Log M1 to SnapM1 in state 610, the snapshot SnapM2 is obtained by completing the application of the changes of Log N2 to the combination of Log M1 and SnapM1 in state 620, as detailed above with regard to symmetric state 640.

In general, the choice of using this alternative embodiment will be based on the relative snapshot completion times x, y, z (of FIG. 2) and a, b, c (of FIG. 7). Generally, because the creation of the snapshot in the alternative embodiment may commence before the transition between snapshots, completion times a, b, and c can be expected to be less than completion times x, y, and z. However, depending upon the relative sizes of the database and the log files, the time required to apply changes to a snapshot may exceed the time required to copy the contents of the database to create a new snapshot.

Other alternative embodiments may be envisioned by one of skill in the art in view of this disclosure. For example, in the alternative embodiment of FIGS. 6 and 7, one of skill in the art may recognize that applying the changes in the logs to the snapshot may be completed quickly, such that the snapshot being updated "catches up" with the transactions being applied to the database. That is, at some point, the last committed transaction in the active log file may be applied to the snapshot file being updated, resulting in the snapshot file being a representation of the current committed state of the database.

If each subsequent committed transaction is applied to the snapshot file as it is being committed to the database, the snapshot file will continue to be "in sync" with the current committed state of the database. Accordingly, the only delay in completing the new snapshot will be the delay incurred for completing pending transactions.

Figure 8:
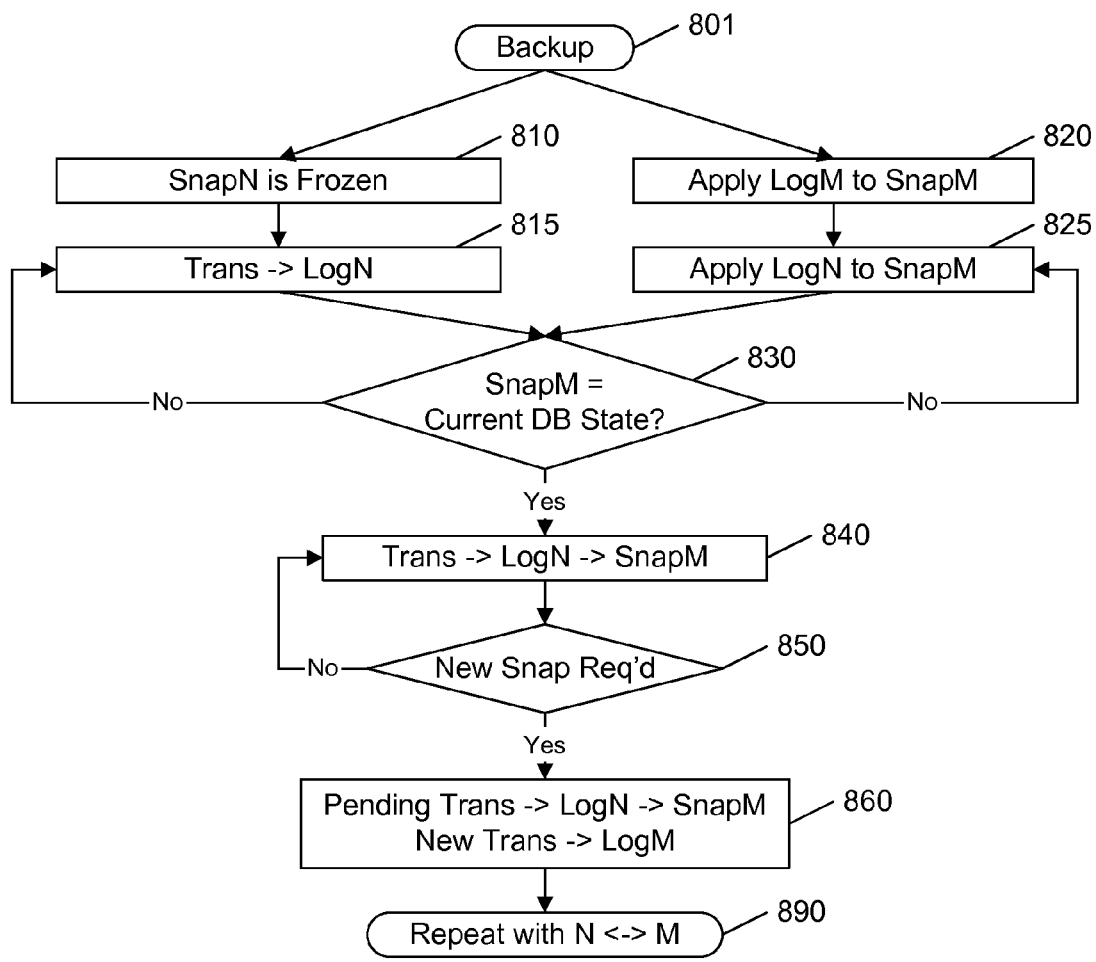
FIG. 8 illustrates an alternative example flow diagram of a database recovery in accordance with aspects of this invention.

FIG. 8 illustrates an example flow diagram for an embodiment of this invention wherein the creation of the snapshot can be expected to eventually be in sync with the committed state of the database. Because the processing of transactions for application on a database can be expected to consume substantially more time than the updating of object values in a snapshot based on previously recorded changes to the object values, the expectation that the updating will eventually catch up with the application of new transactions is reasonable.

During the backup process 801, two parallel processes are performed: the logging of committed transactions, and the creation of new snapshots. In this alternative embodiment, these processes are performed in parallel until the snapshot being created matches the current committed state of the database. Thereafter, newly committed transactions are both logged into the current log, and applied to the snapshot being updated.

In the first parallel process, the prior snapshot SnapN is frozen, at 810 and committed transactions are being logged to Log N, at 815. In the second parallel process, the prior snapshot SnapM is updated by applying the prior log Log M, at 820, followed by the application of the current log Log N, at 825. This logging of transactions to Log N and updating of the prior snapshot continues until the last committed transaction in the current Log N has been applied to the snapshot being updated, SnapM, resulting in SnapM being a representation of the current committed state of the database, at 830.

Thereafter, at 840, all committed transactions continue to be logged into Log N, and continue to be applied to snapshot SnapM, keeping SnapM in sync with the committed state of the database.

When a new snapshot is required, at 850, pending transactions continue to be logged into Log N as they are committed, and continue to be applied to snapshot SnapM, keeping SnapM in sync with the committed state of the database DB(M). All new transactions are logged to Log M, thereby representing all subsequent changes to DB(M).

When the pending transactions are completed, the process 801 is repeated, with M and N reversed. That is, at 810, SnapM is frozen, and at transactions continue to be logged into Log M. At 820, Log N is applied to SnapN, followed by the application of Log M to the combination of SnapN and Log N. When SnapN represents that latest committed state of the database, at 830, the new transactions are logged to Log M and used to update SnapN, at 840. When a new snapshot is required, pending transactions continue to be logged to Log M and used to update SnapN, and new transactions are logged into Log N, at 860. The process is then repeated with M and N reversed again.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although the invention is presented using the example of a database that is entirely in memory 530, one of skill in the art will recognize that in some embodiments, only portions of the database will be in memory 530, as required, depending upon the particular user and/or particular application. In such an embodiment, wherein only the contents of memory 530 may be changed, the snapshot files SnapN, SnapM need only record the state of the in-memory 530 database objects, so that the contents of the memory 530 may be recovered as needed. In like manner, to further reduce the size of the snapshots, each table of the database in memory 530 may include a 'change' flag that is set whenever the contents of the table change, and only the tables marked as changed may be copied to the snapshot files. In such an embodiment, when a recovery is required, the memory 530 receives the database from the persistent storage 540, then the changed tables are restored to the database in memory 530 from the most recent snapshot file, and the changes that had occurred after the snapshot are applied to this updated database in memory 530. These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of a feasible combination of hardware portions (e.g., including discrete and integrated electronic circuitry) and software portions (e.g., computer programming).
f) hardware portions may include a processor, and software portions may be stored on a non-transitory computer-readable medium, and may be configured to cause the processor to perform some or all of the functions of one or more of the disclosed elements;

g) hardware portions may be comprised of one or both of analog and digital portions;

h) any of the disclosed devices or portions thereof may be combined together or separated into further portions unless specifically stated otherwise;

i) no specific sequence of acts is intended to be required unless specifically indicated; and j) the term "plurality of" an element includes two or more of the claimed element, and does not imply any particular range of number of elements; that is, a plurality of elements can be as few as two elements, and can include an immeasurable number of elements.

We claim:

1. A non-transient computer readable medium that includes a computer program that, when executed by a processing system, causes the processing system to:

create a first snapshot of a state of the database at a first time, maintain a first log of committed transactions applied to the database between the first time and a third time, initiate creation of a second snapshot of the state of the database at a second time that is between the first time and the third time, the creation of the second snapshot consuming time after the second time, and maintain a second log of committed transactions applied to the database that were initiated after the second time, wherein:

transactions are written concurrently to the first log and the second log for at least a portion of time after the second time; and in the event of a failure, the program restores the database by causing the processor to:

apply the transactions in the first log to the first snapshot if the failure occurs between the first time and the second time;

apply the transactions in the first log and the second log to the first snapshot if the failure occurs after the second time and before completion of the second snapshot; and apply the transactions in the second log to the second snapshot if the failure occurs after completion of the second snapshot.

2. The medium of claim 1, wherein the program causes the processor to initiate creation of a third snapshot at a fourth time that is after the third time, and the first snapshot is stored at a first region of memory, the second snapshot is stored at a second region of memory, and the third snapshot is stored at the first region of memory, replacing the first snapshot.

3. The medium of claim 2, wherein the program causes the processor to maintain a third log of committed transactions that were initiated after the fourth time, and the first log is stored at a third region of memory, the second log is stored at a fourth region of memory, and the third log is stored at the third region of memory, replacing the first log.

4. The medium of claim 1, wherein pending transactions that commenced before the second time and are not yet committed at the second time are included in the first log of committed transaction when they are committed.

5. The medium of claim 1, wherein the snapshots are created without requiring a lock of the state of the database.

6. A method comprising:

creating a first snapshot of a state of the database at a first time, maintaining a first log of committed transactions applied to the database between the first time and a third time, initiating creation of a second snapshot of the state of the database at a second time that is between the first time and the second time, the creation of the second snapshot consuming time after the second time and maintaining a second log of committed transactions applied to the database that were initiated after the second time, wherein:

transactions are written concurrently to the first log and the second log for at least a portion of time after the second time; and in the event of a failure, the method includes:

applying the transactions in the first log to the first snapshot if the failure occurs between the first time and the second time;

applying the transactions in the first log and the second log to the first snapshot if the failure occurs after the second time and before completion of the second snapshot; and applying the transactions in the second log to the second snapshot if the failure occurs after completion of the second snapshot.

7. The method of claim 6, including initiating creation of a third snapshot at a fourth time after the third time, and wherein the first snapshot is stored at a first region of memory, the second snapshot is stored at a second region of memory, and the third snapshot is stored at the first region of memory, replacing the first snapshot.

8. The method of claim 7, including maintaining a third log of committed transactions that were initiated after the fourth time, and wherein the first log is stored at a third region of memory, the second log is stored at a fourth region of memory, and the third log is stored at the third region of memory, replacing the first log.

9. The method of claim 6, wherein pending transactions that commenced before the second time and are not yet committed at the second time are included in the first log of committed transaction when they are committed.

10. The method of claim 6, wherein the snapshots are created without requiring a lock of the state of the database.

11. A system comprising:

a memory, a database, and a processor that:

receives and executes transactions related to the database over time, creates and stores, in the memory, a first snapshot of a state of the database at a first time, stores, in the memory, a first log of committed transactions applied to the database between the first time and a third time, creates and stores, in the memory, a second snapshot of the state of the database, initiating at a second time that is between the first time and the third time, creation of the second snapshot consuming time after the second time, stores, in the memory, a second log of committed transactions applied to the database that were initiated after the second time, wherein:

transactions are written concurrently to the first log and the second log for at least a portion of time after the second time; and in the event of a failure, the processor:

applies the transactions in the first log to the first snapshot if the failure occurs between the first time and the second time;

applies the transactions in the first log and the second log to the first snapshot if the failure occurs after the second time and before completion of the second snapshot; and applies the transactions in the second log to the second snapshot if the failure occurs after completion of the second snapshot.

12. The system of claim 11, wherein the processor: creates a third snapshot at a fourth time that is after the third time, stores the first snapshot at a first region of the memory, stores the second snapshot at a second region of the memory, and stores the third snapshot at the first region of the memory, replacing the first snapshot.

13. The system of claim 12, wherein the processor: maintains a third log of committed transactions that were initiated after the fourth time and stores the first log at a third region of the memory, stores the second log at a fourth region of the memory, and stores the third log at the third region of the memory, replacing the first log.

14. The system of claim 11, wherein the processor includes pending transactions that commenced before the second time and were not yet committed at the second time in the first log of committed transaction when they are committed.

15. The system of claim 11, wherein the processor creates and stores the snapshots without locking the state of the database.

16. The medium of claim 1, wherein the computer program enables the processor to release the first snapshot after the second snapshot has been completed.

17. The medium of claim 1, wherein the computer program enables the processor to release the first log of committed transactions after the second snapshot has been completed.

18. The method of claim 6, including releasing the first snapshot after the second snapshot has been completed.

19. The method of claim 6, including releasing the first log of committed transactions after the second snapshot has been completed.

20. The system of claim 11, wherein the processor releases the first snapshot after the second snapshot has been completed.

21. The system of claim 11, wherein the processor releases the first log of committed transactions after the second snapshot has been completed.

* * * * *